(12) United States Patent
Dogru et al.

(10) Patent No.: US 12,315,131 B2
(45) Date of Patent: May 27, 2025

(54) DETERMINING CONTOUR EDGES FOR AN IMAGE

(71) Applicant: NVIDIA Corporation, Santa Clara, CA (US)

(72) Inventors: Selim Dogru, Beaverton, OR (US); Kumara Sastry, Portland, OR (US); John Swanson, Banks, OR (US); Vivek K. Singh, Portland, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 389 days.

(21) Appl. No.: 17/833,713

(22) Filed: Jun. 6, 2022

(65) Prior Publication Data

US 2023/0394647 A1  Dec. 7, 2023

(51) Int. Cl.
*G06T 7/00* (2017.01)
*G06T 7/149* (2017.01)

(52) U.S. Cl.
CPC ............ *G06T 7/0008* (2013.01); *G06T 7/149* (2017.01); *G06T 2207/30148* (2013.01)

(58) Field of Classification Search
CPC ......... G06T 7/0008; G06T 7/13; G06T 7/149; G06T 2207/20021; G06T 2207/7149; G06T 2207/30148; G06T 2200/28; G06T 2207/20016; G06T 7/136
See application file for complete search history.

(56) References Cited

U.S. PATENT DOCUMENTS

| 11,790,609 B2 * | 10/2023 | Gruen | G06T 17/205 |
| | | | 345/423 |
| 2017/0098310 A1 * | 4/2017 | Chefd'hotel | G06T 7/13 |
| 2019/0014982 A1 * | 1/2019 | Bhuiyan | G06T 7/44 |
| 2020/0126183 A1 * | 4/2020 | Zhu | G06T 3/4076 |

(Continued)

OTHER PUBLICATIONS

Wikimedia Commons, "File:Marching squares algorithm.svg," Wikimedia Commons, 2020, 3 pages, retrieved from https://commons.wikimedia.org/w/index.php?curid=39714681.

(Continued)

*Primary Examiner* — Bobbak Safaipour
*Assistant Examiner* — Michael Kim Maiden
(74) *Attorney, Agent, or Firm* — Zilka-Kotab, P.C.

(57) ABSTRACT

In order to determine contour edges within a provided image, a plurality of image cells (e.g., groupings of pixels) are created within the image. For each image cell, a numerical value for each of the pixels is compared to a predetermined threshold value to determine comparison values for each pixel. A total numerical value for each image cell may then be determined utilizing the comparison values and numerical values for each pixel within each image cell. An associated contour cell (indicating present contour edges) is then determined for each image cell by comparing the total numerical value for the image cell to a contour cell index. These operations may be performed in parallel by a graphics processing unit (GPU) for each image cell, which may improve a performance of contour edge determination for the image. The stitching of contour edges may also be (Continued)

performed using the GPU, which may provide additional performance improvements for image contour extraction.

27 Claims, 11 Drawing Sheets

(56) References Cited

U.S. PATENT DOCUMENTS

2022/0100170 A1* 3/2022 Wei .................... G06F 30/10
2022/0130051 A1* 4/2022 Bhatt .................. G06T 7/168

OTHER PUBLICATIONS

Wikipedia, "Marching squares," Wikipedia, 2015, 2 pages, retrieved from https://upload.wikimedia.org/wikipedia/commons/0/00/Marching_squares_algorithm.svg on Jun. 6, 2022.

* cited by examiner

DETERMINING CONTOUR EDGES FOR AN IMAGE

FIELD OF THE INVENTION

The present invention relates to image analysis, and more particularly to determining contour edges within a provided image.

BACKGROUND

Optical lithography (such as photolithography) is a common method by which integrated circuits and other computing hardware are fabricated. Photosensitive material deposited on substrate is patterned by using light and one or more masks. A contour edge determination by thresholding light intensity images may enable manufacturers to determine where such photosensitive material deposits will remain on the substrate after each photolithography step during the manufacturing process. However, currently such contour edge determinations are performed by a central processing unit (CPU) and are resource-intensive and slow.

There is therefore a need to improve the performance and resource usage of these contour edge determinations.

DETAILED DESCRIPTION

In order to determine contour edges within a provided image, a plurality of image cells (e.g., groupings of pixels) are created within the image. For each image cell, a numerical value for each of the pixels is compared to a predetermined threshold value to determine comparison values for each pixel. A total numerical value for each image cell may then be determined utilizing the comparison values and numerical values for each pixel within each image cell. An associated contour cell (indicating present contour edges) is then determined for each image cell by comparing the total numerical value for the image cell to a contour cell index. These operations may be performed in parallel by a graphics processing unit (GPU) for each image cell, which may improve a performance of contour edge determination for the image.

Figure 1:
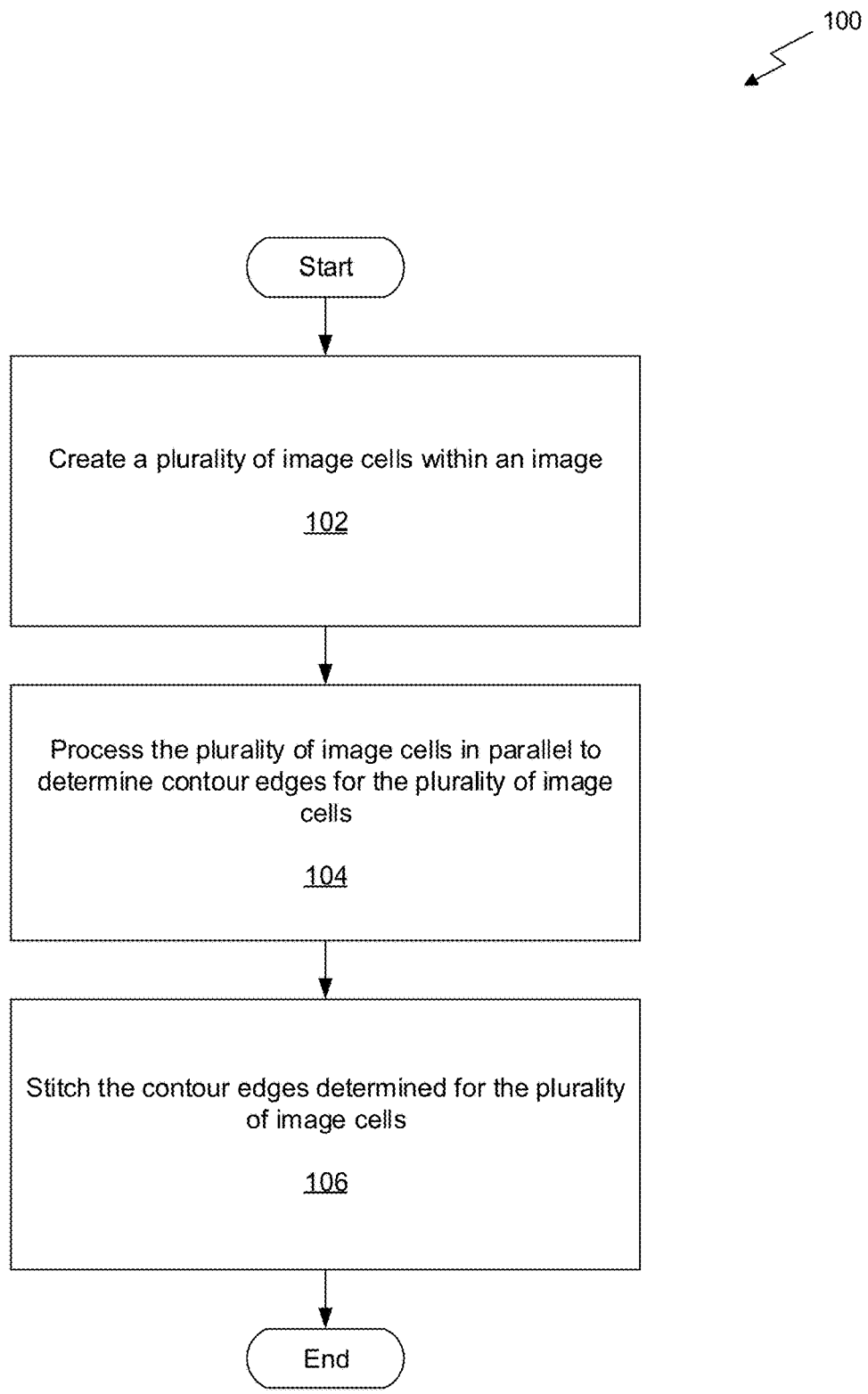
FIG. 1 illustrates a flowchart of a method for determining contour edges for an image, in accordance with an embodiment.

FIG. 1 illustrates a flowchart of a method 100 for determining contour edges for an image, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a plurality of image cells is created within an image. In one embodiment, the image may include a photolithography image (e.g., an image used during one or more photolithography processes, etc.). In another embodiment, the image may include a plurality of pixels. In yet another embodiment, each of the plurality of pixels may have an associated numerical value. For example, the numerical value may indicate an amount of light intensity at the corresponding pixel (e.g., during the photolithography process).

Additionally, in one embodiment, each image cell may have a square configuration. In another embodiment, each image cell may include four corners (e.g., four pixels at each corner of the square configuration). In yet another embodiment, every set of four pixels that are adjacent to each other in a square configuration may be grouped into an image cell within the image.

Further, as shown in operation 104, the plurality of image cells is processed in parallel to determine contour edges for the plurality of image cells. In one embodiment, each of the plurality of image cells may be processed independently from the other image cells within the image. For example, a plurality of the image cells may be processed in parallel utilizing a graphics processing unit (GPU). In another example, each core of the CPU may be assigned an image cell separate from the other image cells in the image for processing. In yet another example, shared memory may be used to store values for pixels that need to be loaded by multiple threads within the GPU.

Further still, in one embodiment, each of the plurality of image cells may be processed utilizing a marching squares approach. In another embodiment, each image cell may include four pixels (one at each corner of the image cell). In yet another embodiment, for each image cell, the numerical value for each of the four pixels may be compared to a predetermined threshold value.

For example, if the numerical value of a pixel within the image cell is larger than the threshold, the pixel is assigned a first comparison value (e.g., a value of one, etc.). In another example, if the numerical value of a pixel within the image cell is equal to or less than the threshold, the pixel is assigned a second comparison value (e.g., a value of zero, etc.). This may result in comparison values for each corner pixel within each image cell.

Also, in one embodiment, for each image cell, a total numerical value for the image cell may be determined utilizing the comparison values and numerical values for each corner pixel within each image cell. For example, for each image cell, all pixels within the image cell having a second comparison value are identified. In another example, the numerical values for each of these identified pixels may be summed to determine the total numerical value for the image cell.

In addition, in one embodiment, for each image cell, an associated contour cell may be determined for the image cell utilizing the total numerical value for the image cell. For example, for each image cell, the total numerical value for the image cell may be compared to a contour cell index. In another example, the contour cell index may include a plurality of predetermined contour cells, where each contour cell is associated with a predetermined numerical value. In yet another example, for each image cell, an associated contour cell may be determined from the contour cell index for the image cell. In still another example, for each image cell, a contour cell may be determined within the contour cell index that has a predetermined numerical value matching the total numerical value for the cell. In another example, contours from a contour cell may be inserted into a matching image cell.

Furthermore, in one embodiment, the associated contour cell for an image cell may indicate one or more contour edges present within the image cell. For example, contour edges may include a portion of a contour. In another example, the contour may indicate a shape of photosensitive material remaining on a substrate after a photolithography process has occurred (e.g., using one or more masks, etc.).

In this way, an unordered collection of contour edges may be determined for an image in parallel, utilizing a graphics processing unit (GPU). For example, each of a plurality of cores within the GPU may be assigned to an image cell different from the other image cells within the image. Each core may then process its assigned image cell to determine one or more contour edges for the image cell. This may reduce an amount of time needed to perform contour edge detection for an image, which may improve a performance of one or more hardware computing devices performing such contour edge detection.

Further still, as shown in operation 106, the contour edges determined for the plurality of image cells are stitched. In one embodiment, for each image cell, a start point and an end point may be determined for each contour edge within the image cell. In another embodiment, for each image cell, associated numerical values for each pixel within the image cell may be interpolated to determine crossing points (e.g., a start point and end point) for each contour edge within the image cell.

Also, in one embodiment, the contour edges determined for the plurality of image cells may be stitched utilizing the crossing points for each contour edge within each image cell. For example, crossing points may be matched between adjacent cells to determine a complete contour edge. In another example, an end point for a first contour edge within a first image cell may match a start point for a second contour edge within a second image cell.

Additionally, in one embodiment, the stitching may result in the creation of a complete contour within the image. In another embodiment, the crossing points may be determined during the processing of the plurality of image cells in parallel. For example, these crossing points may be computed dynamically and may not be stored in persistent memory. This may reduce an amount of persistent memory used to perform stitching, which may improve a performance of one or more hardware devices performing such stitching.

Further, in one embodiment, the crossing points may be stored within a hierarchical data structure (e.g., a GPU search tree, etc.). For example, a mapping between each contour edge and its associated crossing points may be stored in the hierarchical data structure. In another example, these mappings may be determined and stored in parallel while performing contour edge determination.

Further still, in one embodiment, the hierarchical data structure may be used by the GPU to perform the stitching. For example, this may reduce an amount of time needed to perform the stitching by the GPU (which may improve a performance of the GPU).

Also, in one embodiment, contour edges crossing a border (e.g., perimeter) of the image may be addressed by dynamically padding one or more portions of the image associated with the contour edges that cross the border. For example, when a contour edge is determined to cross a border of the image, padding may be performed by adding an additional pixel to the border of the image where the crossing occurs. In another example, padding may be performed during the determination of the contour edges for the plurality of image cells. In yet another example, this may increase a speed of the marching squares approach when processing the plurality of image cells in parallel to determine contour edges.

In addition, in one embodiment, given an intensity profile of light within an image, the determined contour edges may be used to identify a location of contours formed by such light, where the contours indicate photosensitive material that remains on a substrate corresponding to the image after a photolithography process has been performed. In another embodiment, the light profile may be adjusted in response to determining the contour edges within the image. In yet another embodiment, photolithography may be performed, utilizing the light profile for the image.

Figure 2:
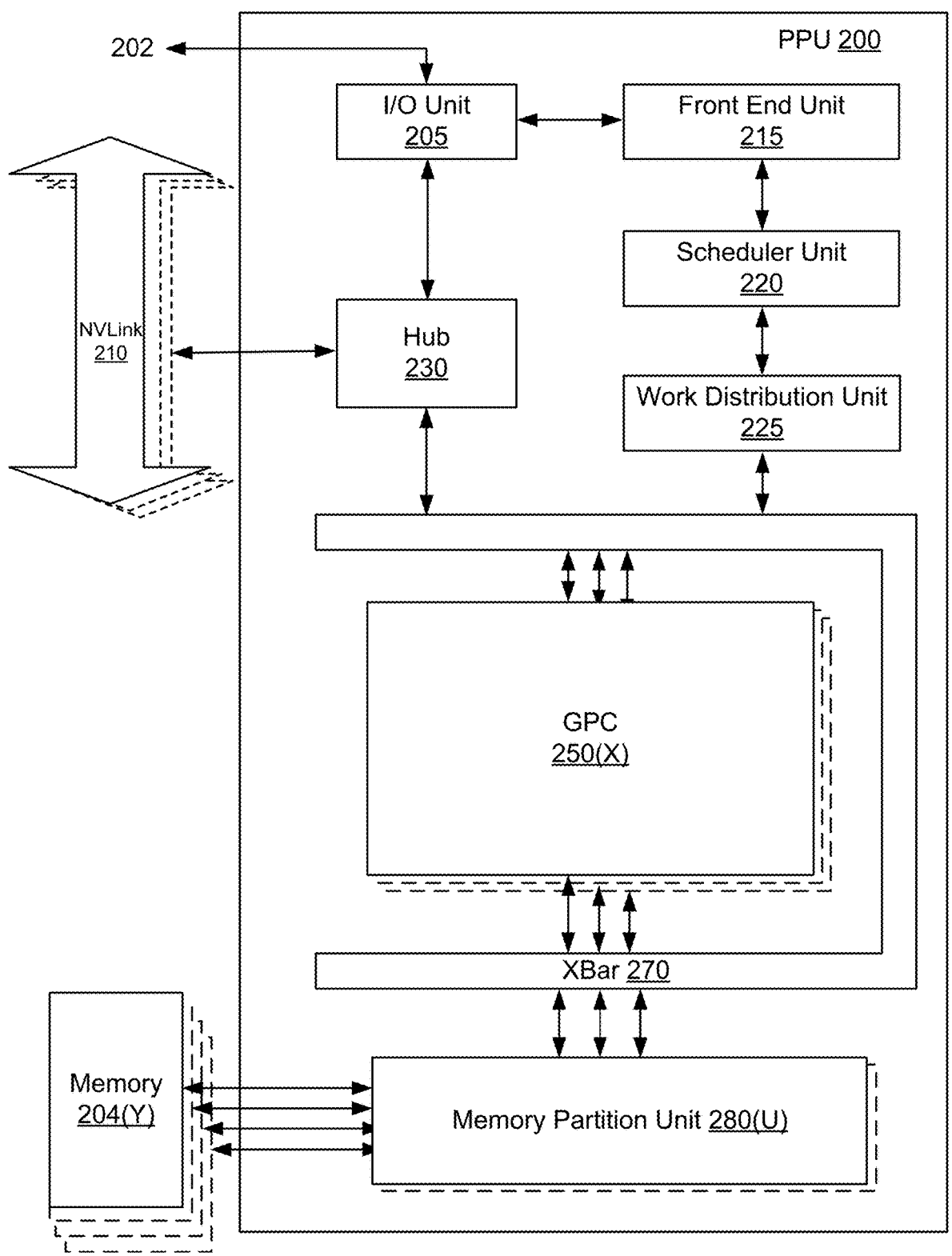
FIG. 2 illustrates a parallel processing unit, in accordance with an embodiment.

In yet another embodiment, the above operations may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
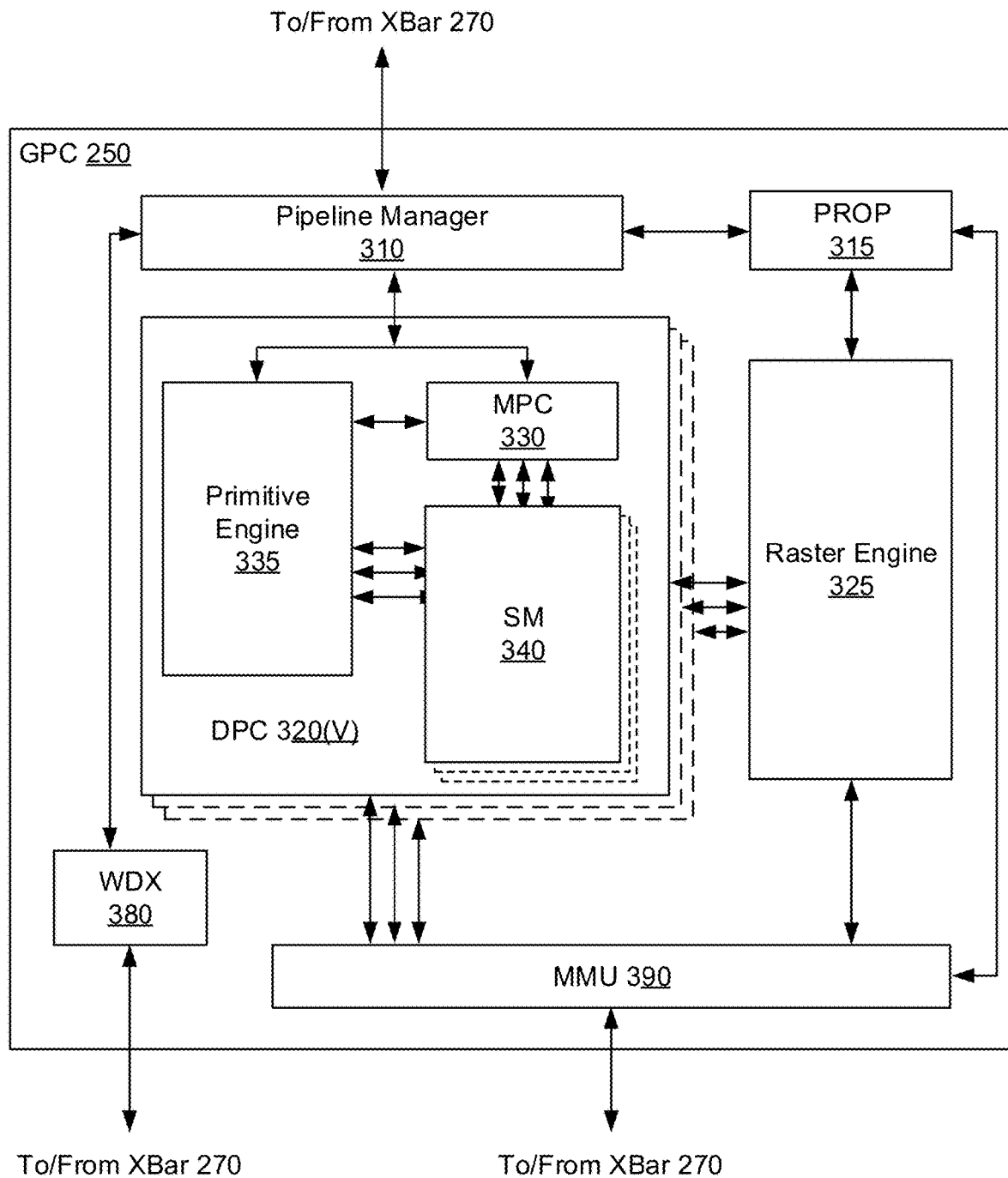
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
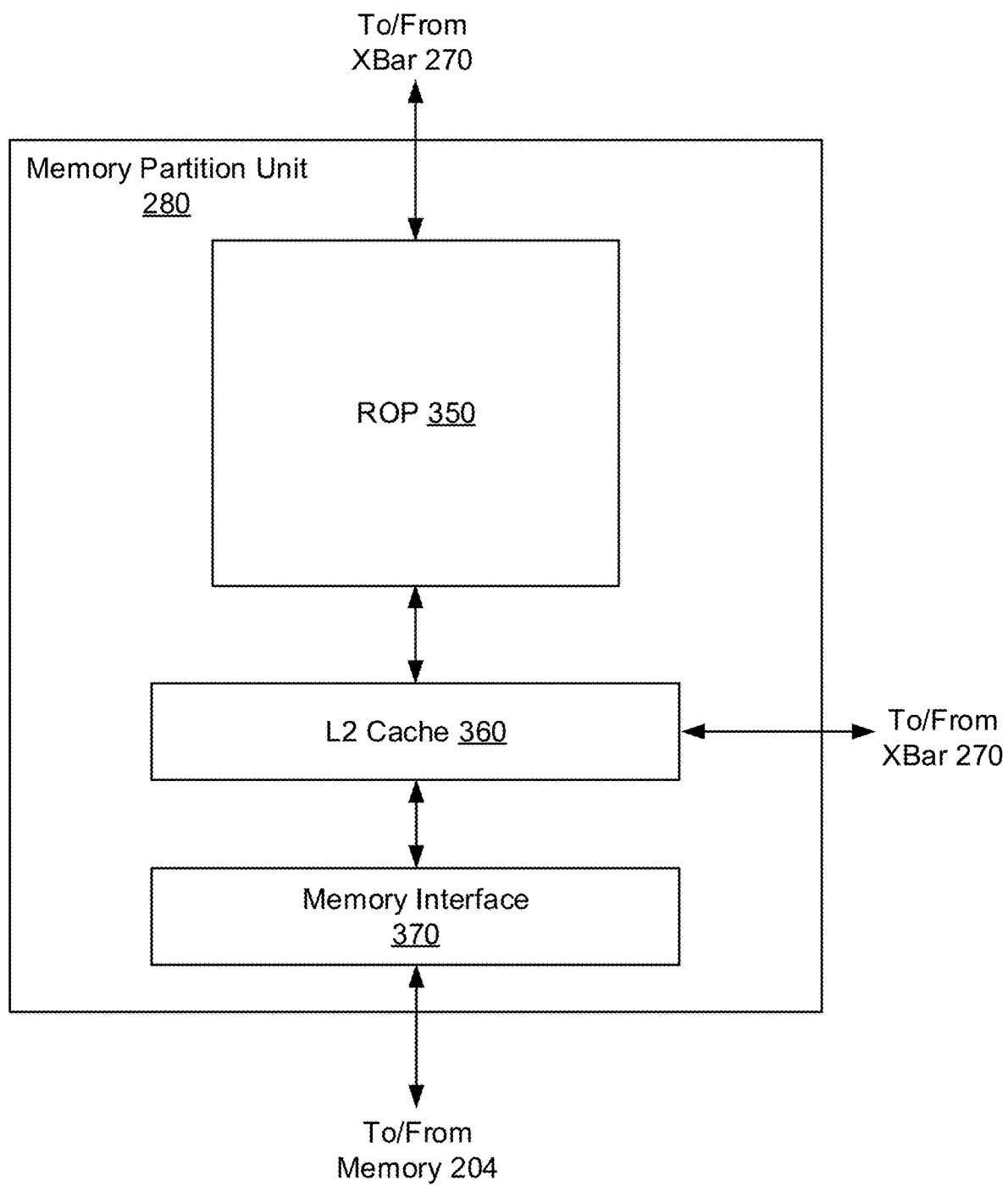
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
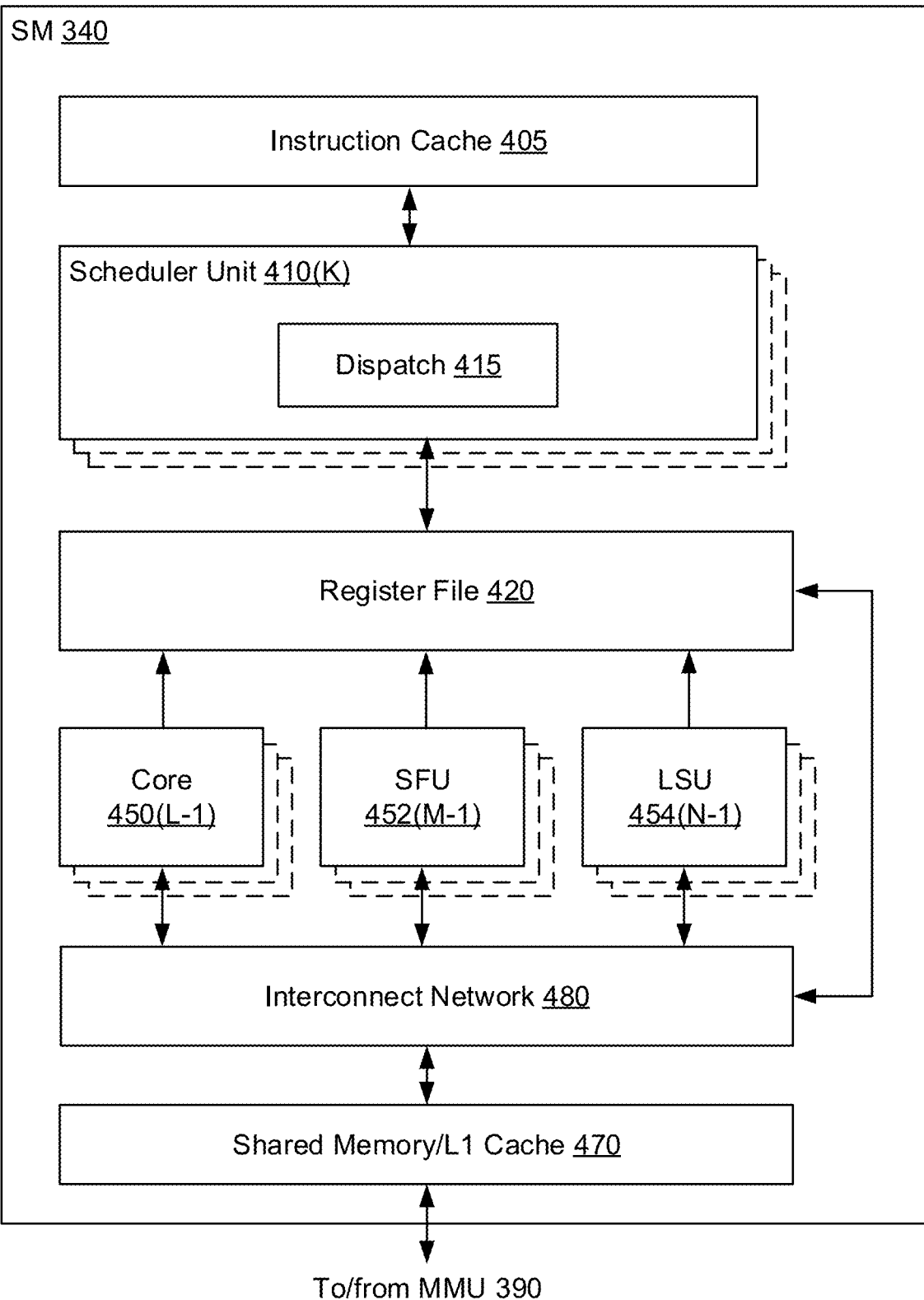
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
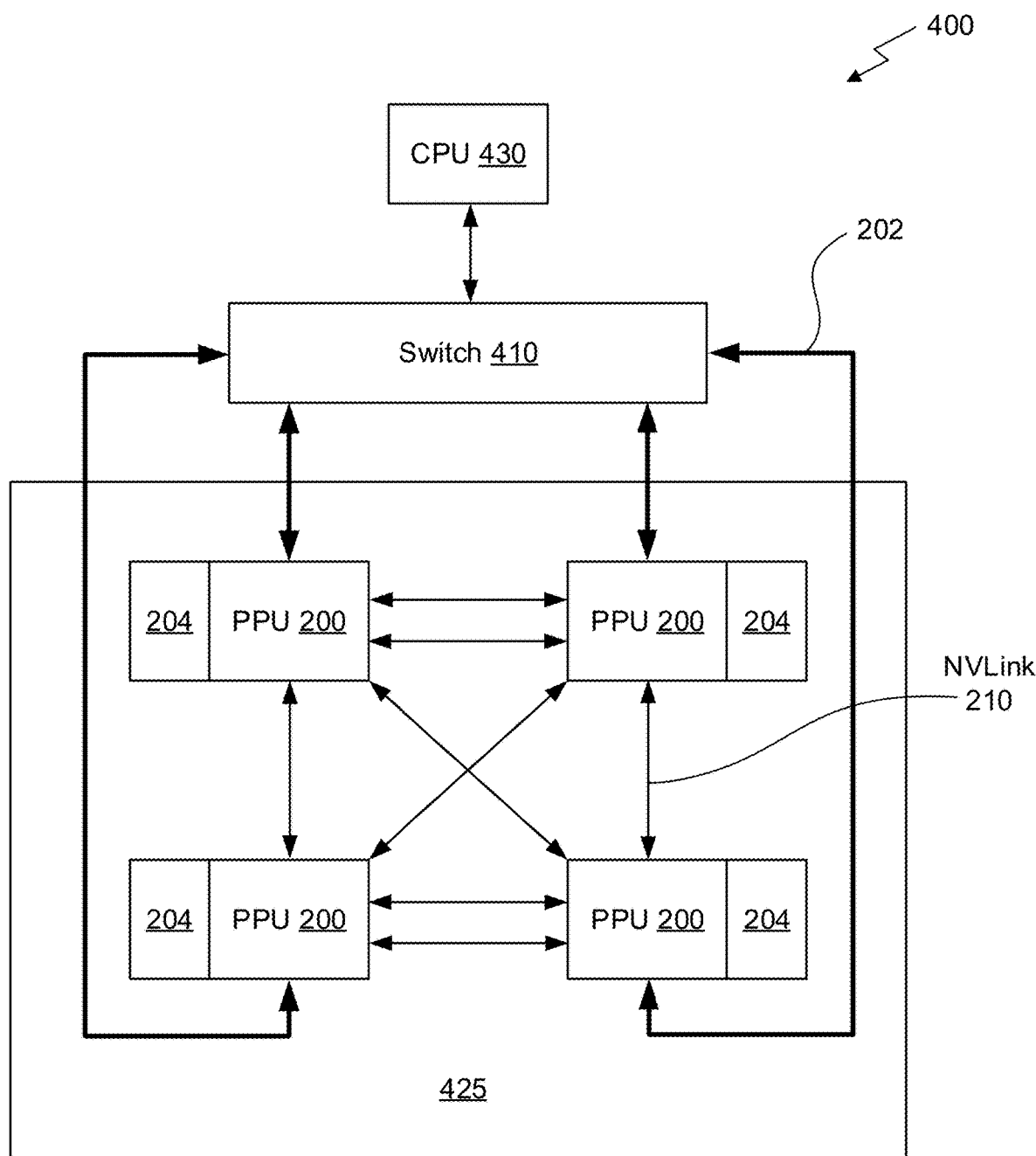
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
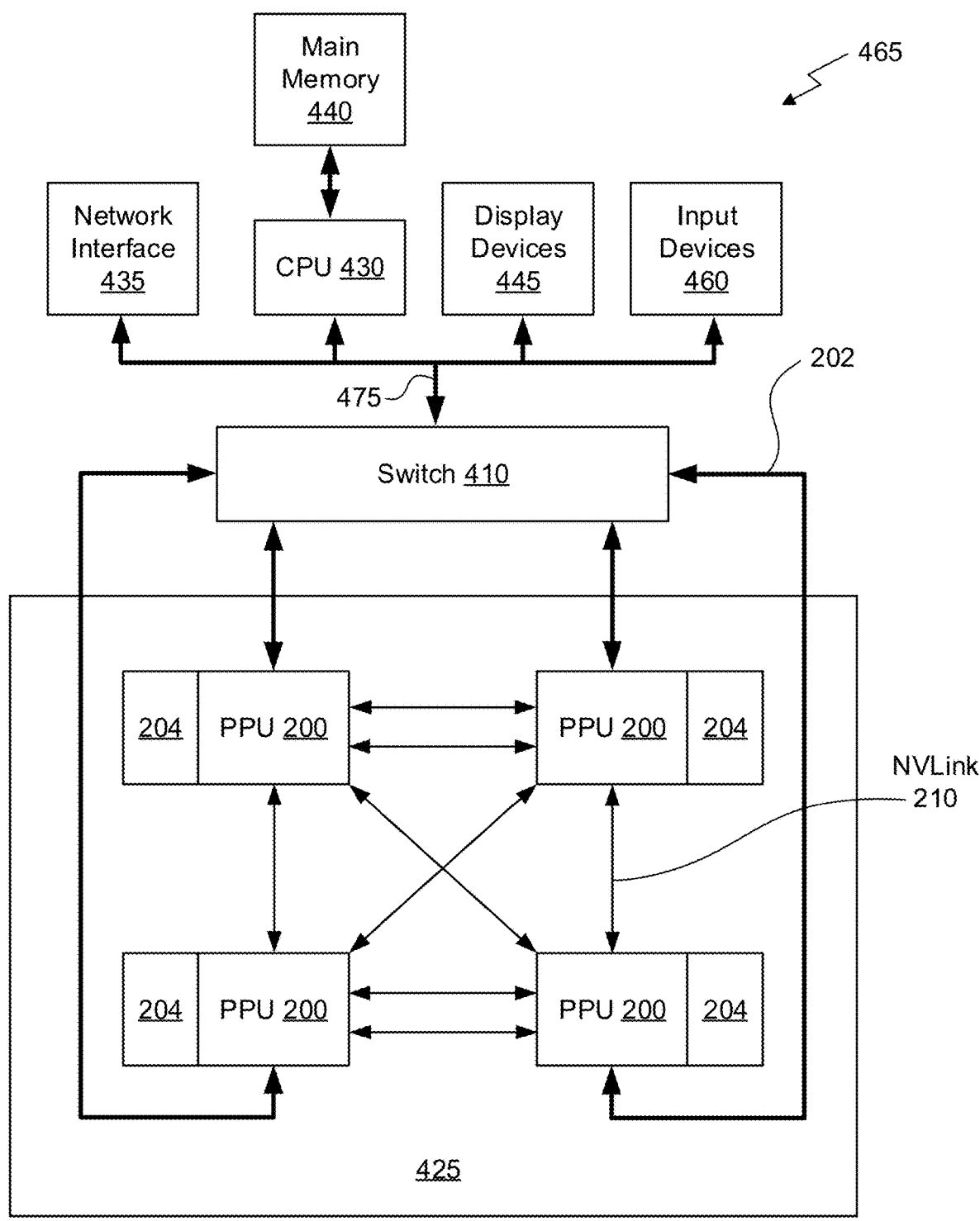
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Figure 5:
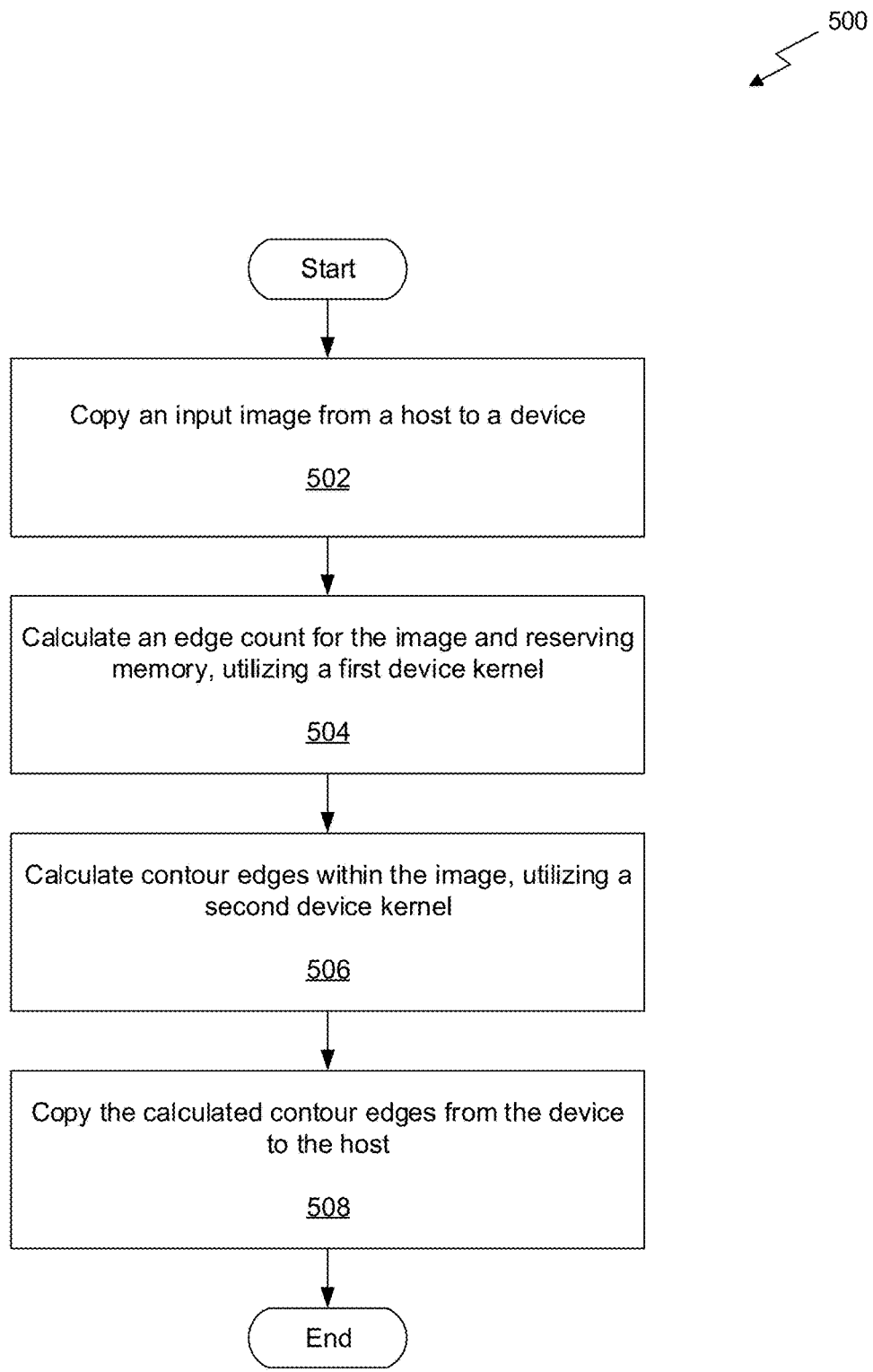
FIG. 5 illustrates a flowchart of a method for performing contour edge extraction, in accordance with an embodiment.

FIG. 5 illustrates a flowchart of a method 500 for performing contour edge extraction, in accordance with an embodiment. Although method 500 is described in the context of a processing unit, the method 500 may also be performed by a program, custom circuitry, or by a combination of custom circuitry and a program. For example, the method 500 may be executed by a GPU (graphics processing unit), CPU (central processing unit), or any processing element. Furthermore, persons of ordinary skill in the art will understand that any system that performs method 500 is within the scope and spirit of embodiments of the present invention.

As shown in operation 502, an input image is copied from a host to a device. In one embodiment, the input image may include a photolithography image. In another embodiment, the host may include a central processing unit (CPU). In yet another embodiment, the device may include a graphics processing unit (GPU).

Additionally, as shown in operation 504, an edge count is calculated for the image and memory is reserved, utilizing a first device kernel. In one embodiment, the first kernel of the GPU may create a plurality of image cells within the input image. In another embodiment, the first kernel of the GPU may determine an associated contour cell for each image cell within the input image. In yet another embodiment, an edge count including a total number of contour edges may be determined based on the associated contour cells for all image cells within the input image. In still another embodiment, the first kernel of the GPU may reserve an amount of memory needed to store edge data associated with the determined edge count.

Further, as shown in operation 506, contour edges are calculated within the image, utilizing a second device kernel. In one embodiment, the second kernel of the GPU may process the plurality of image cells in parallel to determine contour edges for the plurality of image cells. In another embodiment, the second kernel may use the reserved memory to perform the processing.

Further still, as shown in operation 508, the calculated contour edges are copied from the device to the host. In one embodiment, the contour edges calculated at the GPU may be sent from the GPU to the CPU.

Figure 6:
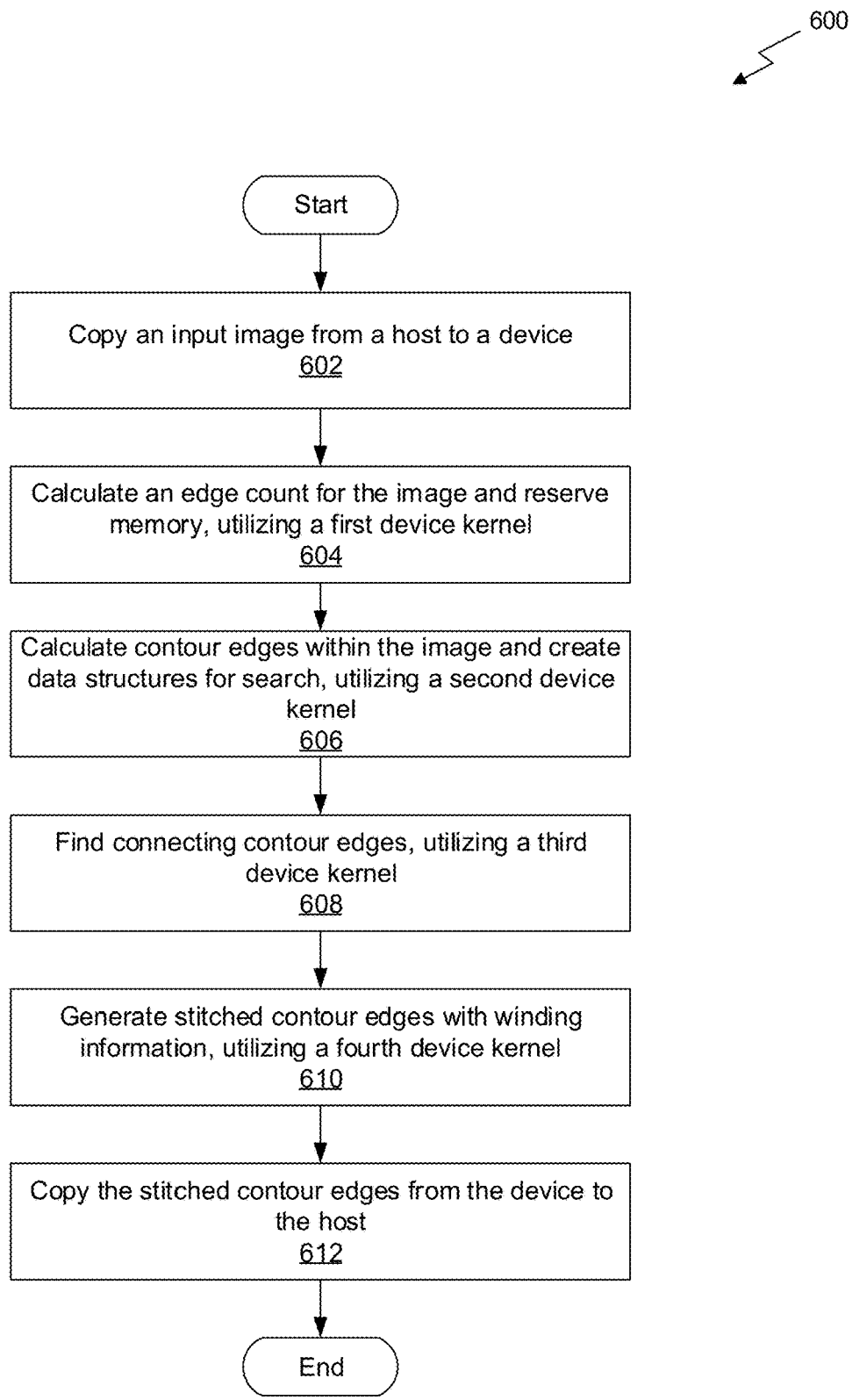
FIG. 6 illustrates a flowchart of a method for performing contour edge extraction and stitching, in accordance with an embodiment.

FIG. 6 illustrates a flowchart of a method 600 for performing contour edge extraction and stitching, in accordance with an embodiment. Although method 600 is described in the context of a processing unit, the method 600 may also be performed by a program, custom circuitry, or by a combination of custom circuitry and a program. For example, the method 600 may be executed by a GPU (graphics processing unit), CPU (central processing unit), or any processing element. Furthermore, persons of ordinary skill in the art will understand that any system that performs method 600 is within the scope and spirit of embodiments of the present invention.

As shown in operation 602, an input image is copied from a host to a device. In one embodiment, the input image may include a photolithography image. In another embodiment, the host may include a central processing unit (CPU). In yet another embodiment, the device may include a graphics processing unit (GPU).

Additionally, as shown in operation 604, an edge count is calculated for the image and memory is reserved, utilizing a first device kernel. In one embodiment, the first kernel of the GPU may create a plurality of image cells within the input image. In another embodiment, the first kernel of the GPU may determine an associated contour cell for each image cell within the input image. In yet another embodiment, an edge count including a total number of contour edges may be determined based on the associated contour cells for all image cells within the input image. In still another embodiment, the first kernel of the GPU may reserve an amount of memory needed to store edge data associated with the determined edge count.

Further, as shown in operation 606, contour edges within the image are calculated and data structures for search are created, utilizing a second device kernel. In one embodiment, the second kernel of the GPU may process the plurality of image cells in parallel to determine contour edges for the plurality of image cells. In another embodiment, the second kernel of the GPU may determine crossing points for each contour edge within each image cell. In yet another embodiment, the second kernel of the GPU may create a hierarchical data structure (e.g., a GPU search tree, etc.), and may store the crossing points in such data structure. In still another embodiment, the second kernel may use the reserved memory to perform the processing.

Further still, as shown in operation 608, connecting contour edges are found utilizing a third device kernel. In one embodiment, the third kernel may utilize the hierarchical data structure to determine matching crossing points between adjacent cells within the image.

Also, as shown in operation 610, stitched contour edges are generated with winding information, utilizing a fourth device kernel. In one embodiment, the fourth kernel may stitch the contour edges determined for the plurality of image cells utilizing the connecting contour edges identified utilizing the third device kernel. In another embodiment, the winding information may include a predetermined ordering for the stitched contour edges.

In addition, as shown in operation 612, the stitched contour edges are copied from the device to the host. In one embodiment, the stitched contour edges calculated at the GPU may be sent from the GPU to the CPU.

Figure 7A:
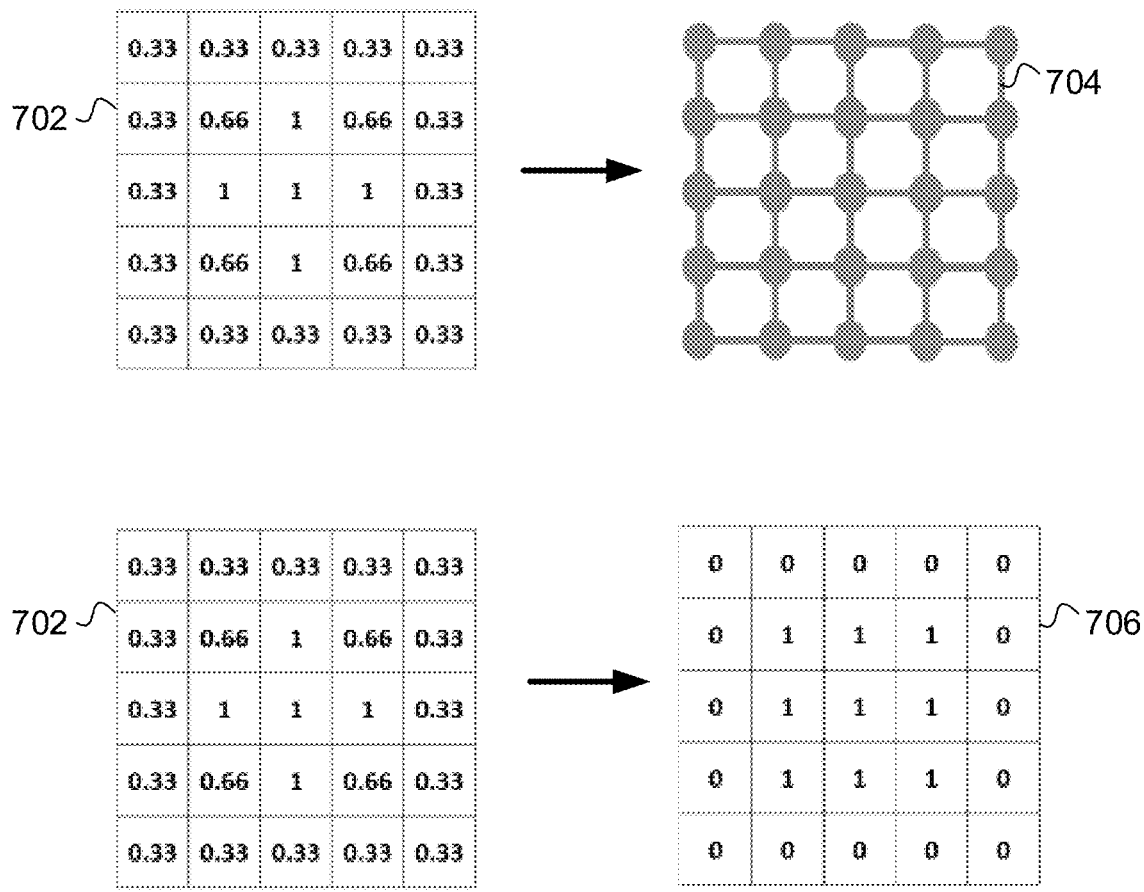
FIG. 7A illustrates a first portion of an exemplary marching squares contour edge detection implementation, in accordance with an embodiment.
Figure 7B:
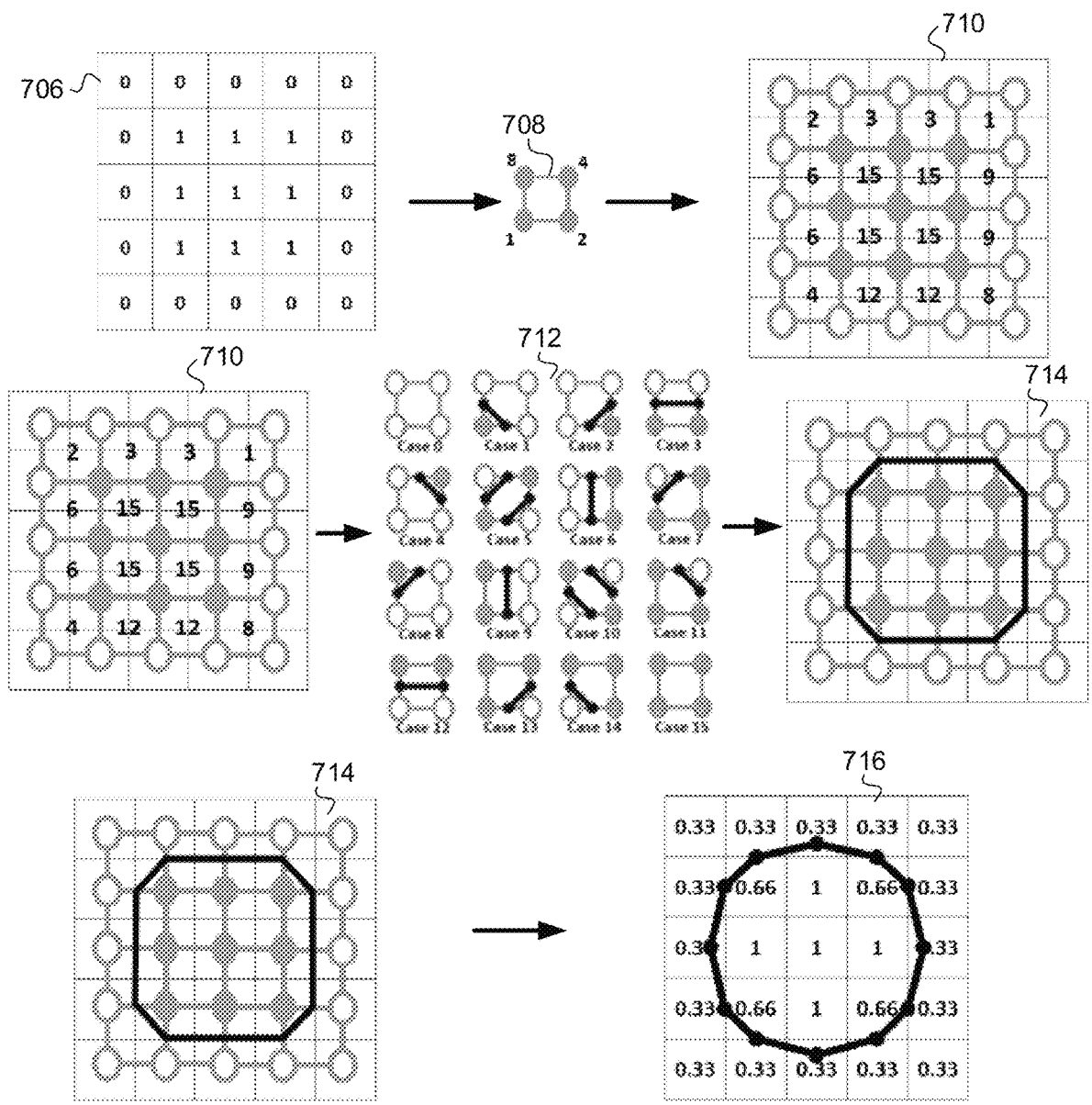
FIG. 7B illustrates a second portion of an exemplary marching squares contour edge detection implementation, in accordance with an embodiment.

FIGS. 7A-7B illustrate an exemplary marching squares contour edge detection implementation, according to one exemplary embodiment. As shown in FIG. 7A, an image 702 with a numerical value for each of a plurality of pixels is processed to determine a plurality of image cells 704. For example, if the image 702 includes H×W pixels, (H−1)×(W−1) image cells may be created, where each image cell includes a 2×2 block of pixels.

Additionally, the numerical values for pixels at the corners of each image cell are compared with an input threshold value. If the value at a corner pixel is determined to be above the threshold, the corner pixel is assigned a value of one, otherwise if the value at the corner pixel the same or below the threshold, the corner pixel is assigned a value of zero. This results in comparison values 706 for each corner pixel within each image cell.

Further, as shown in FIG. 7B, all pixels within the image cell having a comparison value of zero are identified within the comparison values 706, and the corner values 708 for each of these identified pixels are summed to determine total numerical values for each image cell 710. Further still, for each image cell, the total numerical value for each image cell is compared to a contour cell index 712 to determine a contour cell 714 for the image cell.

Linear interpolation is then applied to the numerical values of each pixel within the image 714 to determine stitched contour edges 716.

GPU-Accelerated Resist Contour Edge Extraction and Stitching Using Marching Squares Algorithm In one embodiment, GPU acceleration methods are applied to resist contour edge extraction and stitching for optical proximity correction (OPC) algorithms. This improves a performance of resist contour edge extraction when compared to CPU-based methods and utilizes an embarrassingly parallel marching squares algorithm. If stitched contours are required, extracted edges are inserted into GPU-optimized hierarchical data structures for searching. Search results generated on the GPU are used to stitch contours. The combined edge extraction and stitching method has an improved performance when compared to CPU-based methods. The method provides floating-point accuracy for contour points.

Contour Stitching

For some applications (e.g., contour simplification and fitting), contours need to be stored as an ordered series of connected edges. This data format may also be more efficient since it removes duplicate points. In response a marching squares algorithm can be modified to create hierarchical data structures which are needed for search on a GPU while processing each contour cell in parallel. Search results generated on the GPU may be used to stitch contours.

In one embodiment, the image may be padded with a single pixel to avoid contour edges crossing the image border since special handling of these edges degrades the run-time performance of the algorithm. Padding may be added to the kernel to generate contour edges instead of the image data to prevent extra memory usage and runtime.

In one embodiment, contour edges may be extracted in floating point accuracy independently by using four pixel values at a 2×2 pixel block (e.g., a contouring cell). A number of duplicative memory accesses and a time needed to access may be reduced by using shared memory for pixel values that need to be loaded by multiple threads.

Hierarchical data structures that are needed for stitching may be created during contour edge extraction in parallel on a GPU. A search required for contour stitching may be performed on the GPU. Stitching operations may be simplified by using one-pixel padding to avoid contour edges crossing the border of the image. Padding logic may be added to the kernel which generates contour edges instead of the image data to prevent extra memory usage and runtime.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
creating a plurality of image cells within an image; and
processing the plurality of image cells in parallel to determine contour edges for the plurality of image cells, the processing for each image cell of the plurality of image cells including:
computing a numerical value for the image cell as a function of one or more pixels covered by the image cell,
using the numerical value for the image cell as an index to a contour cell of a plurality of predefined contour cells,
wherein the contour cell indicates one or more contour edges present within the image cell.

2. The method of claim 1, wherein each of a plurality of pixels within the image has an associated numerical value indicating an amount of light intensity at the pixel.

3. The method of claim 1, wherein each image cell includes four pixels at each corner of a square configuration.

4. The method of claim 1, wherein each of the plurality of image cells is processed independently from the other image cells within the image, in parallel, utilizing a graphics processing unit (GPU).

5. The method of claim 4, wherein shared memory is used to store values for pixels that need to be loaded by multiple threads within the GPU.

6. The method of claim 1, wherein each of the plurality of image cells is processed utilizing a marching squares approach.

7. The method of claim 1, further comprising stitching contour edges determined for the plurality of image cells.

8. The method of claim 7, wherein the stitching includes interpolating associated numerical values for each pixel within each image cell to determine crossing points for each contour edge within each image cell.

9. The method of claim 8, wherein the crossing points are stored within a hierarchical data structure.

10. The method of claim 9, wherein the hierarchical data structure is used by a GPU to perform the stitching.

11. The method of claim 1, further comprising addressing contour edges crossing a border of the image by dynamically padding one or more portions of the image associated with the contour edges that cross the border.

12. A system comprising:
a hardware processor of a device that is configured to:
create a plurality of image cells within an image; and
process the plurality of image cells in parallel to determine contour edges for the plurality of image cells, the processing for each image cell of the plurality of image cells including:
computing a numerical value for the image cell as a function of one or more pixels covered by the image cell,
using the numerical value for the image cell as an index to a contour cell of a plurality of predefined contour cells,
wherein the contour cell indicates one or more contour edges present within the image cell.

13. The system of claim 12, wherein each of a plurality of pixels within the image has an associated numerical value indicating an amount of light intensity at the pixel.

14. The system of claim 12, wherein each image cell includes four pixels at each corner of a square configuration.

15. The system of claim 12, wherein each of the plurality of image cells is processed independently from the other image cells within the image, in parallel, utilizing a graphics processing unit (GPU).

16. The system of claim 15, wherein shared memory is used to store values for pixels that need to be loaded by multiple threads within the GPU.

17. The system of claim 12, wherein each of the plurality of image cells is processed utilizing a marching squares approach.

18. The system of claim 12, wherein the hardware processor is further configured to stitch contour edges determined for the plurality of image cells.

19. A non-transitory computer-readable storage medium storing instructions that, when executed by a processor of a device, causes the processor to cause the device to:
create a plurality of image cells within an image; and
process the plurality of image cells in parallel to determine contour edges for the plurality of image cells, the processing for each image cell of the plurality of image cells including:
computing a numerical value for the image cell as a function of one or more pixels covered by the image cell,
using the numerical value for the image cell as an index to a contour cell of a plurality of predefined contour cells,
wherein the contour cell indicates one or more contour edges present within the image cell.

20. The computer-readable storage medium of claim 19, wherein the instructions cause the processor to cause the device to stitch contour edges determined for the plurality of image cells.

21. The method of claim 1, wherein computing the numerical value for the image cell as the function of one or more pixels covered by the image cell includes:
determining a pixel-level numerical value for each pixel of a plurality of pixels covered by the image cell, wherein the pixel-level numerical value indicates an amount of light intensity at the pixel,
assigning a comparison value to each pixel of the plurality of pixels based on a comparison of the pixel-level numerical value of the pixel to a preconfigured threshold,
computing the numerical value for the image cell as a function of the pixel-level numerical value of each pixel of the plurality of pixels and the comparison value of each pixel of the plurality of pixels.

22. The method of claim 21, wherein the plurality of pixels include only a subset of all pixels covered by the image cell.

23. The method of claim 21, wherein the plurality of pixels include only pixels positioned at each corner of the image cell.

24. The method of claim 21, wherein the comparison value is a first predefined value when the pixel-level numerical value of the pixel exceeds the preconfigured threshold, and wherein the comparison value is a second predefined value when the pixel-level numerical value of the pixel is less than or equal to the preconfigured threshold.

25. The method of claim 21, wherein the numerical value for the image cell is computed by:
determining one or more pixels of the plurality of pixels having a comparison value that matches a predefined comparison value, and
summing the pixel-level values of the determined one or more pixels to form the numerical value for the image cell.

26. The method of claim 1, further comprising:
inserting the contour edges into the image.

27. The method of claim 26, wherein the inserting includes:
inserting a contour of the contour cell into the image cell.

* * * * *